United States Patent [19]

Ketonen

[11] Patent Number: 5,564,484
[45] Date of Patent: Oct. 15, 1996

[54] COLOR-MARKING ASSEMBLY IN THE CUTTING FLANGE OF A TIMBER HARVESTER

[76] Inventor: Lauri K. Ketonen, Huvilakatu 15, Fin-64120 Kristiinankaupunki, Finland

[21] Appl. No.: 432,190
[22] PCT Filed: Nov. 12, 1993
[86] PCT No.: PCT/FI93/00476
 § 371 Date: May 2, 1995
 § 102(e) Date: May 2, 1995
[87] PCT Pub. No.: WO94/11165
 PCT Pub. Date: May 26, 1994
[30] Foreign Application Priority Data
 Nov. 12, 1992 [FI] Finland ................................. 925136
[51] Int. Cl.⁶ ........................... A01G 23/08; B05C 11/00
[52] U.S. Cl. ................ 144/34.1; 30/123.4; 118/40; 118/41; 401/137; 427/289; 144/336; 144/380; 144/4.8
[58] Field of Search ............................... 30/123.3, 123.4, 30/387; 401/137; 427/284, 291; 144/3 N, 34 R, 336, 364, 380; 118/40, 41

[56] References Cited

U.S. PATENT DOCUMENTS

| | | | |
|---|---|---|---|
| 4,169,173 | 9/1979 | Bergholm et al. | 144/3 N |
| 5,143,131 | 9/1992 | Seigneur et al. | 144/3 N |

*Primary Examiner*—W. Donald Bray
*Attorney, Agent, or Firm*—C. J. Fildes & Co.

[57] ABSTRACT

The object of the invention is a colour-marking arrangement in the cutting flange of timber harvester. The arrangement includes a flange (1) with a carrier (6, 7), an adapted pipework (4), a series of channels (12) formed to the carrier (6, 7) and connected to the pipework (4), which ends opposite to the connector connections (11). The pipework (4) is formed from a separate component (4, 9, 10) from the flange (1), and is adapted to be set into the flange (1) in a space (3) reserved for it in the same way as the flange (1) is set into the carrier (6, 7) by means of a longitudinal movement.

9 Claims, 3 Drawing Sheets

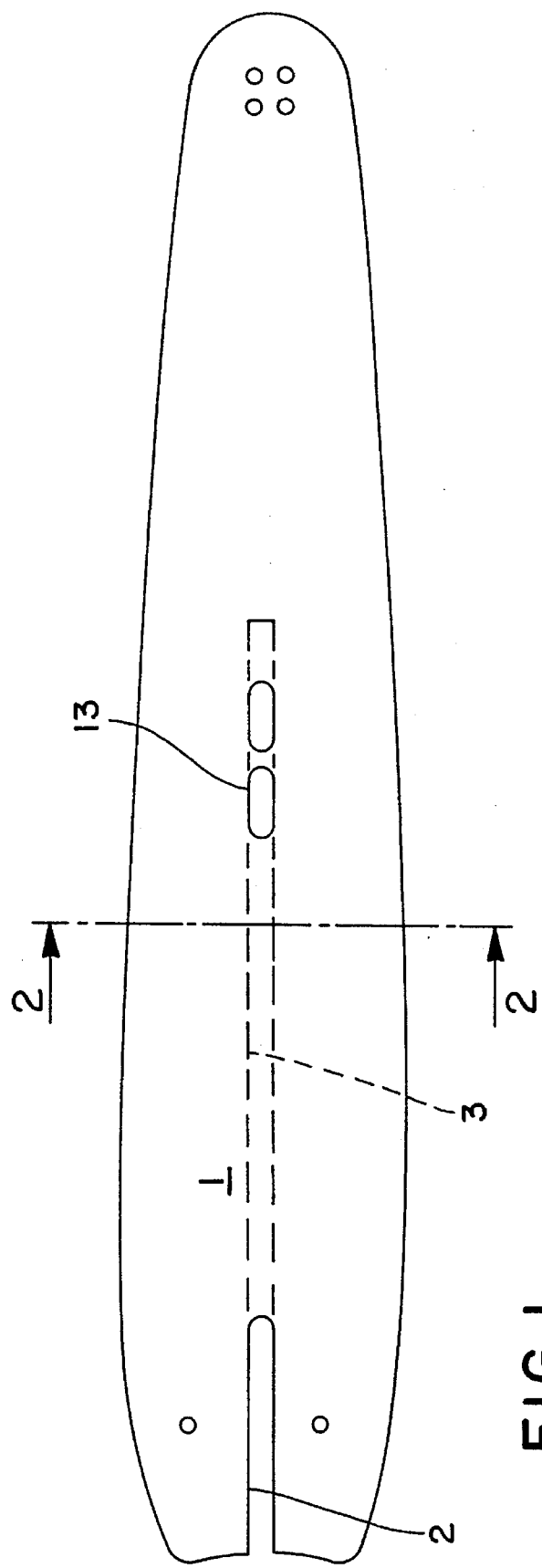
FIG. 1
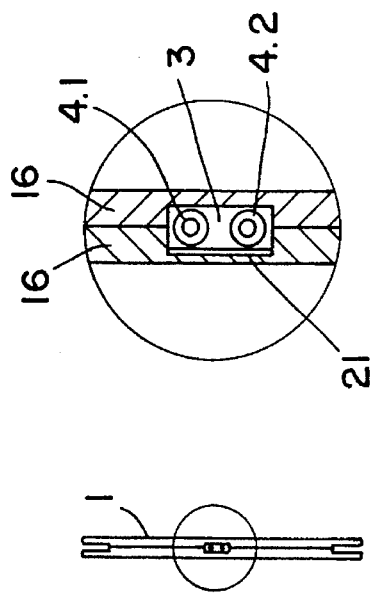
FIG. 2a
FIG. 2

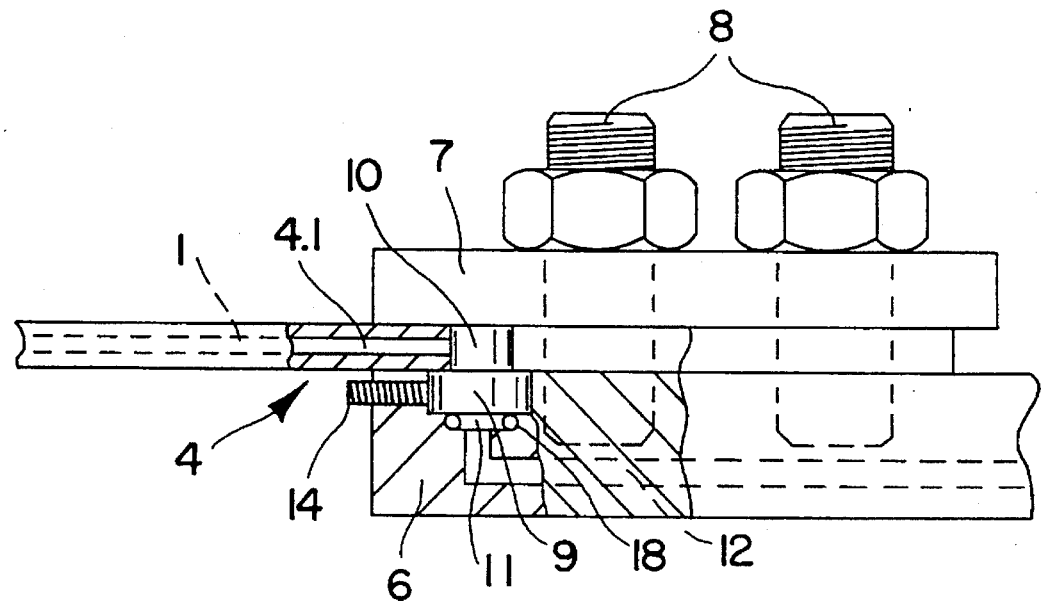
FIG. 5
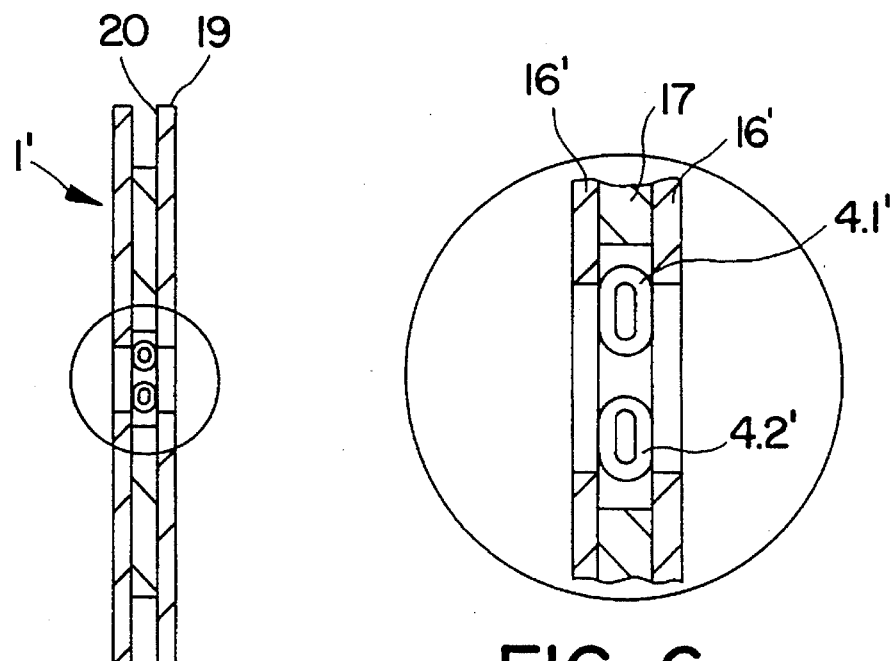
FIG. 6
FIG. 6a

COLOR-MARKING ASSEMBLY IN THE CUTTING FLANGE OF A TIMBER HARVESTER

The object of this invention is a colour-marking arrangement in the cutting flange of a timber harvester, which arrangement includes pipework adapted to the flange with the flange carrier, a channel network formed to the carrier and connected to the pipework, which ends at the connections opposite the pipework, and which flange shall be set on the carrier essentially to be able to move longitudinally.

The spraying of liquids through the flange onto a cut tree or especially the stump has been in practice in Finland for several years. As liquids, use is made of urea in the treatment of stumps and colour substances in the separation and recognition of logs. Suitable flanges for the urea treatment have been available, but colour-marking flanges have only now during the past year been on market trials. The main problem in colour-marking flanges has been their one-handedness i.e. it is only possible to wear one side of the flange. This hats increased operating costs. It is true that a method is known for making two-handed flanges by machining grooves to a separate pipework on the outer surfaces on both sides of the flange. A chain wears the flange in such a way that the depth of the groove diminishes on the loaded side.

The intention of the invention is to create a colour-marking arrangement in a flange, in which there would be either simultaneously a colour and urea spraying possibility, or only one or the other of these operations. The flange should be two-handed, so that both sides of it can be worn. The characteristic features of the invention are presented in the accompanying Patent claims.

It is advantageous to manufacture a liquid-spraying flange in accordance with the invention from two parts. Flanges manufactured from one part are also known. Nowadays the vast majority of flanges are manufactured from three parts. The advantages in comparison to flanges manufactured from a single part are simpler construction and due to that a lower price. The disadvantage is lower strength compared to a one-part flange.

In addition, in a flange in accordance with the invention it is easy to prevent leaks in the transfer of liquids from the frame component of the carrier to the flange. This is because the end piece of the pipework that moves freely inside the flange can be located in the frame component. Also the delivery of liquid to the end piece of the pipework can be made from either side of the flange. In new machines it is advantageous to bring the liquid through the frame component that carries the flange. In retro-fitting it may be more advantageous to bring the liquid through the component that tightens the flange.

Most advantageously the flange is thus manufactured from at least two components, in which case the intention is to create a space for the pipework longitudinally in the centre of the flange in its interior section. The space required by the pipework depends on the number of pipes. Through openings are provided in the flange from its space for the pipework. Through these openings, liquid is able to be sprayed from holes in the sides of the pipes. The space extends in the longitudinal direction a little beyond the final opening and the ends of the pipes are plugged. In general, two pipes are required for colour-marking and one pipe for urea. When spraying urea there must be several spray-holes and through openings in the flange.

In what follows the invention is illustrated by reference to the accompanying Figures, which show various colour-marking arrangements in accordance with the invention.

FIG. 1 is a side view of a flange without the pipework.

FIG. 2 is a cross-sectional view from the line 2—2 of FIG. 1, with the pipework shown.

FIG. 2a is an enlargement of the circled portion of FIG. 2.

FIG. 5 shows the attachment arrangement of the flange together with the pipework, seen from and edge and in partial cross-section FIG. 6 is a cross-sectional view similar to FIG. 2 but showing an alternative embodiment of flange.

Figure 3:
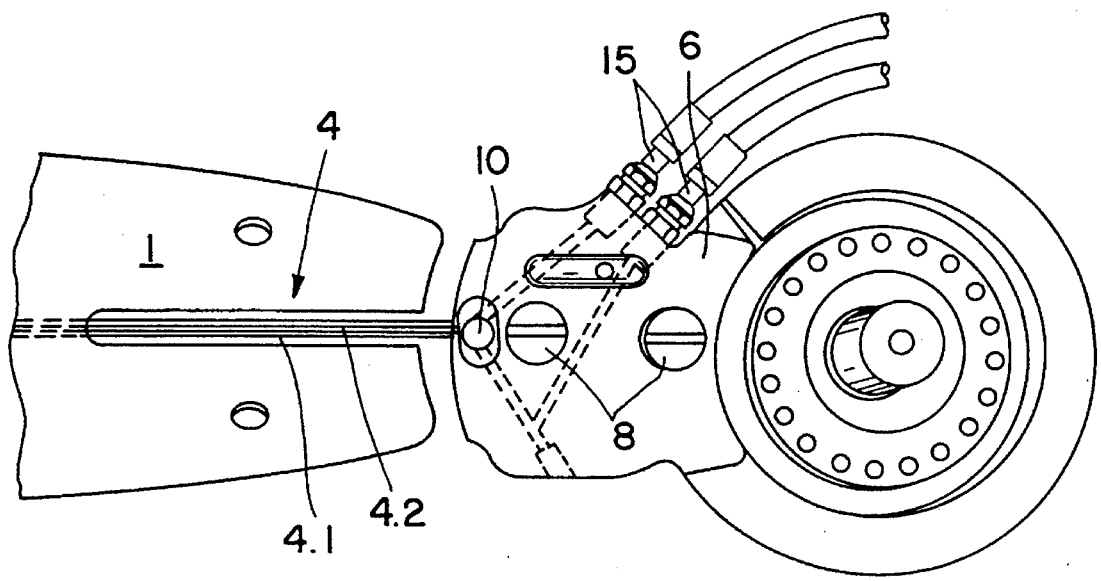
FIG. 3 is a partially assembled side view showing the pipework assembled to the frame of the carrier and partially installed in the flange but before the full installation of the flange on the carrier.
Figure 4:
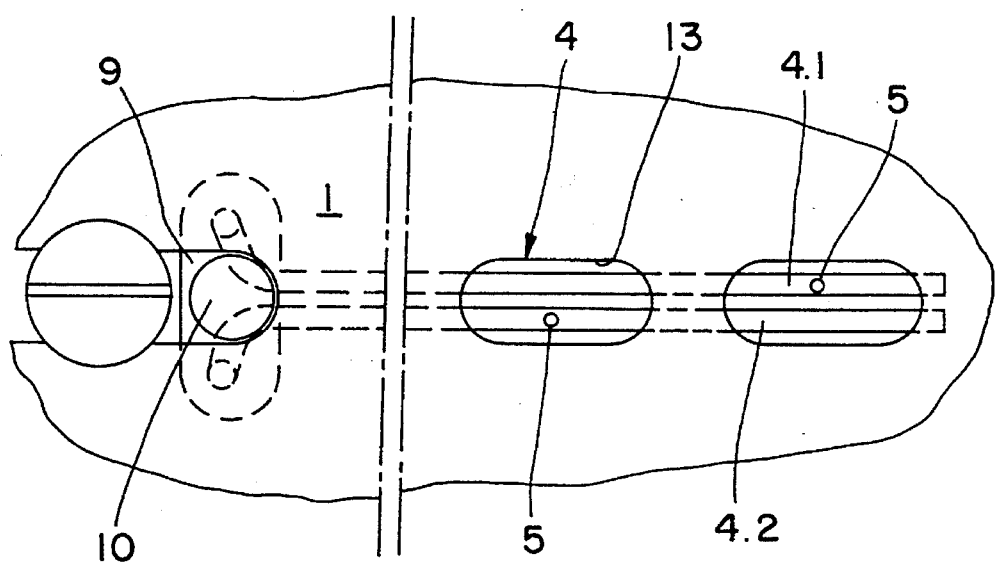
FIG. 4 is a partial enlargement of a portion of the flange of FIG. 1 as assembly with the carrier and associated pipework.

FIG. 1 shows a chain-guiding cutting flange 1 for a timber harvester according to the invention. The flange 1 includes an attachment end having a longitudinal mounting slot or loop 2 connecting with a symmetrically positioned interior spade 3 extending longitudinally within the flange 1 from the inner end of the loop 2.

The longitudinal space 3 remaining inside the flange 1 is most easily formed by manufacturing the flange from two parts, 16 (FIG. 2a) or three parts 16', 17 (FIG. 6a); which are laid on top of one another. At the spraying points along their central faces, all the outer parts or sides 16, 16' have openings 13, FIG. 1. FIG. 2 shows the location of pipes 4.1 and 4.2 making up pipework 4 in the interior space 3 of the flange 1. At its simplest the space 3 is formed of an extension to the loop 2 of the flange 1. Alternatively, as in FIG. 2, two symmetrically set internal grooves are formed, prior to assembly when machining of the flange is still possible. In FIGS. 6 and 6a, the flange 1' is manufactured from three parts, two sides 16' and a center piece 17, and the pipes 4.1' and 4.2' are slightly squashed.

FIG. 3 shows the location of the pipework 4 in the frame 6 of the carrier of the flange 1 before the installation in it of the flange itself. Pipework 4 here consists of two pipes 4.1 and 4.2 connected to an end piece 10. The end piece 10 includes channels and connections, through which liquid is fed from the carrier frame 6. The flange 1 is pushed into place in such a way that pipes 4.1 and 4.2 are directed into the space 3 of the flange 1 and finally the upper part of the end piece 10 and the bolts 8 are received into and remain in the loop of the flange 1. In order that the pipework is positively inserted into the space 3 during the installation of flange 1 and remains locked in relation to the carrier, there is a raised protrusion 9 from the level of the flange in the end piece, which penetrates either the frame 6 of the carrier, as here, or the opposite tightening piece 7. The external raised part 9 is larger, so that the holes made in its surface can be sealed e.g. with O-rings 18, see FIG. 5. It is advantageous that the O-rings 18 are located in the counter piece of the end piece 10, i.e. in the carrier frame or in the tightening piece. In addition to the O-rings 18 of the connections 11, FIG. 5 shows one of the channels 12, which lead to the feed connections 15 (FIG. 3). They are connected to the liquid feed system in a known manner. The pipework end piece 10 is locked in place by means of screw 14.

The normal thickness of the flange is 6 mm and its length 600 mm. In the arrangement in accordance with FIG. 1 the attachment loop 2 of the flange is extended by 10 mm. If the flange is manufactured from two pieces, the grooves of the central channel can be milled in such a way that a pair of 2 mm pipes will fit into it. In the three-part flange in accordance with FIG. 6, the pipes are preferably squashed into the space determined by the centre piece 17. In a flange intended for three pipes there is reason to widen the loop and following channel in the flange from the normal 10 mm to 16 mm. The width of the openings 13 is left at 15 mm, however. As seen in FIG. 6, the outer edge or ring 19, of the flange 1 or 1' is formed with a chain groove 20 to carry a cutting chain in known manner.

The separate pipes 4.1, 4.2 of the pipework 4 are advantageously bound to one another from the opposite side of the spraying holes 5 by means of a longitudinal thin plate 21, which is arranged to completely close the openings 13 on the opposite side from the spraying holes 5. A plate of this kind increases the stiffness of the pipework, which is an advantage in the installation stage.

By means of a flange in accordance with the invention it is possible, especially in the urea spraying of stumps, to save a great deal of urea. This is realized when at least two pipes are used in urea spraying. Urea is sprayed onto small stumps from only one pipe. Spraying onto large stumps takes place from both pipes. Thus the second pipe now covers the area that is not covered by the small stump spraying pipe. The places of the nozzles of the pipe are arranged in such a way that they are aimed at on average the diameter of the desired stump. At present there are thickness measurement devices in timber harvesters, which provide the required control information.

A great advantage in changing chains and flanges; lies in the fact that the pipework can be locked to the frame or tightening piece from the end piece. During these work stages urea or colour does not flow onto the flange tightening and attachment surfaces. The pipework is entirely separate and can be locked onto the frame part or tightener. In the same way the pipework can be used on several flanges, by changing only the flange. Further, it is possible when working with small trees to use a pipework dimensioned especially for this work. The handedness of the flange, the intended application, and the places of the nozzles do not depend on the flange. Thus it is possible to manufacture and store flanges for a great number of customers without necessarily knowing the final application of them. A blocked pipework can be replaced with a new one, but it is generally easy to clean a straight pipe.

The parts 16 or 16', 17 of the flange that lie one on top of one another are attached to one another by, for example, point welding or rivets.

I claim:

1. A colour-marking arrangement in the cutting flange of a timber harvester, in which the arrangement includes a flange (1) with a carrier (6, 7), a series of channels (12) formed in the carrier (6, 7) and connected to pipework (4), which ends at connections (11) with the channels (12), said flange (1) being attachable to the carrier (6, 7) essentially by means of a movement longitudinal to it, and wherein the pipework (4) is adapted to be set into the flange (1) in a space (3) reserved for it, characterized in that the pipework (4) consists of a connection piece (9, 10) and parallel pipes (4.1, 4.2) connected to it, and which connection piece (9, 10) is adapted to be set first into the carrier (6, 7) and to form a connection of the pipework (4) to the channels (12) of the carrier (6, 7), and the space (3) in the flange is adapted to receive the parallel pipes (4.1, 4.2) when the flange is set into the carrier (6, 7).

2. A colour-marking arrangement in accordance with claim 1, characterized in that the space (3) reserved for the pipework (4) is located symmetrically in the flange (1), so that the flange (1) can be detached, turned through 180° and reinstalled in order to even wear on both sides of the flange.

3. A colour-marking arrangement in accordance with claim 1, characterized in that outer ends of the pipes (4.1, 4.2) of the pipework (4) are plugged and spraying holes (5) are formed in the sides, adjacent to which openings (13) are formed in the flange (1).

4. A colour-marking arrangement in accordance with claim 3, characterized in that the pipes (4.1, 4.2) extend in a longitudinal direction slightly further than the openings (13) formed in the flange (1).

5. A colour-marking arrangement in accordance with claim 1, characterized in that between the connection piece (9, 10) of the pipework (4) and the carrier (6, 7) of the flange there is a ring seal (18) associated with each channel.

6. A colour-marking arrangement in accordance with claim 1, characterized in that the connections (11) and channels (12) adjacent the connection piece (9, 10) are formed in the frame (6) of the carrier.

7. A colour-marking arrangement in accordance with claim 1, characterized in that the flange (1) is formed from at least two parts (16), which together form a space (3) between them for the pipework (4).

8. A colour-marking arrangement in accordance with claim 1, characterized in that the separate pipes (4.1, 4.2) of the pipework (4) are bound together by means of a longitudinal thin plate (19) mounted on the opposite side to the spraying holes (5), the plate (19) being positioned to completely close the openings (13) on the side opposite the spraying holes (5).

9. A timber harvester flange (1) for colour-marking, which includes an outer ring equipped with a chain groove, and an attachment end equipped with an attachment loop, which is engageable with the bases of associated attachment bolts, characterized in that the loop is extended by essentially its width to receive an attachment piece (10) of associated pipework (4) within the loop, and the flange (1) includes a space (3) forming a straight channel symmetrically in a centre portion and forming an extension of the loop for receiving the pipework, and one or more openings (13) from the space (3) for spraying outwards.

* * * * *